Sept. 25, 1962  J. C. BUSBY ETAL  3,055,759
TEMPERATURE INDICATORS
Filed April 13, 1959  2 Sheets-Sheet 1
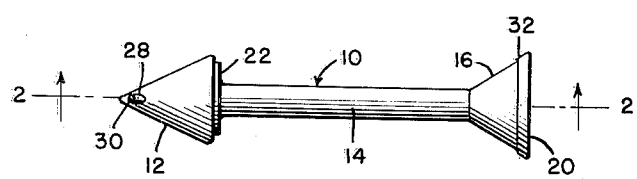
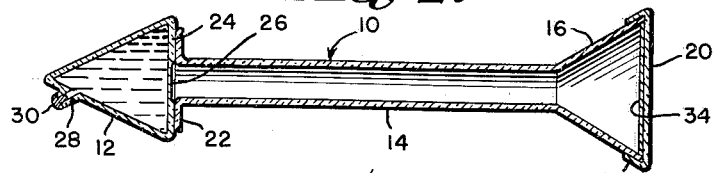
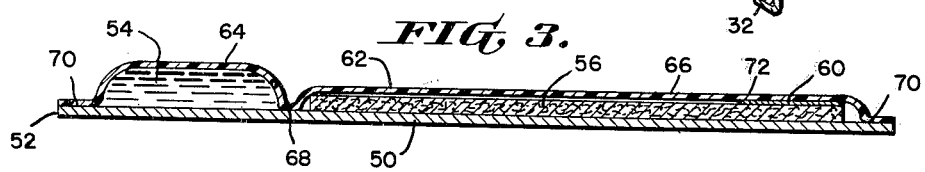
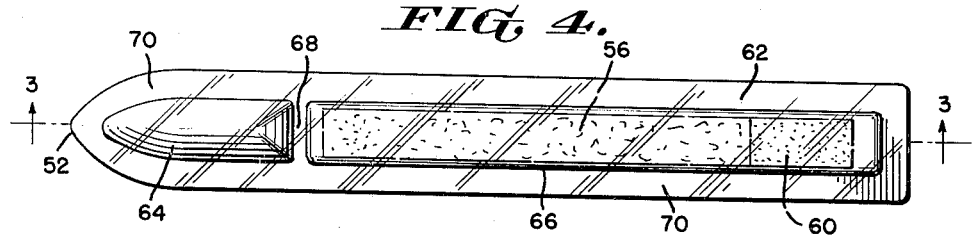
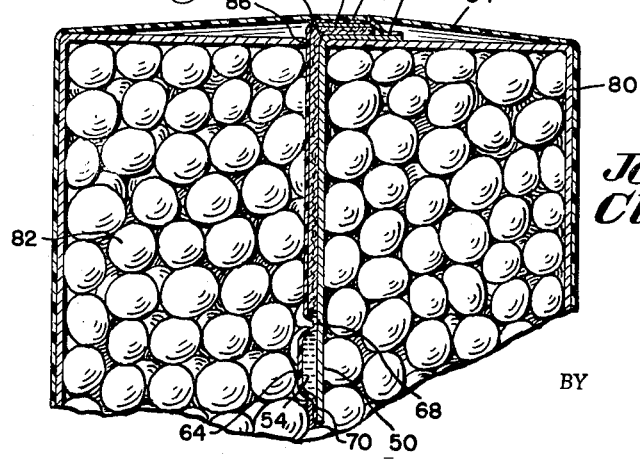
John C. Busby,
Clarence Retzky,
INVENTORS
BY
ATTORNEYS

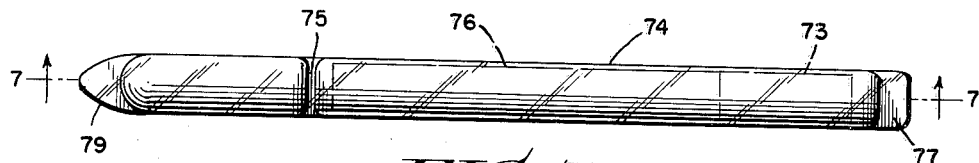
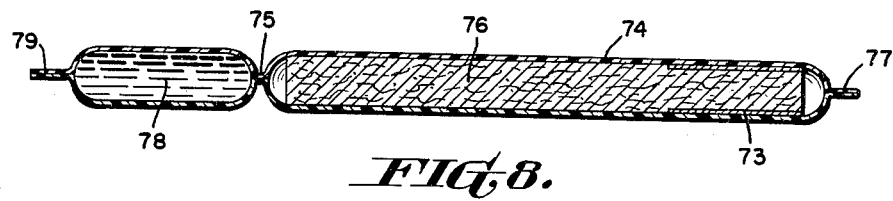
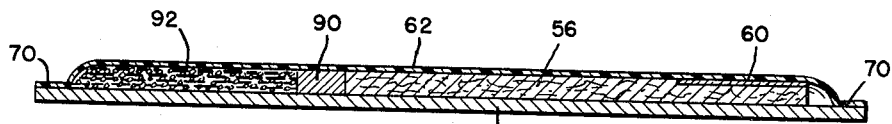
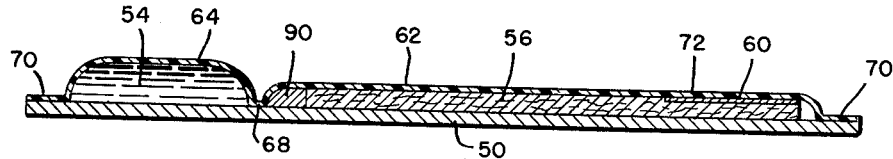
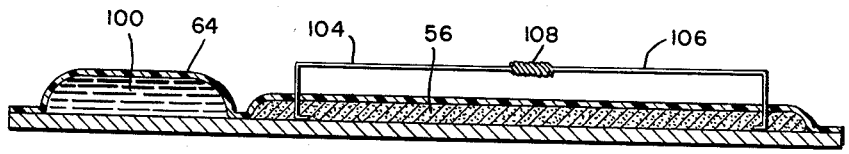
John C. Busby,
Clarence Retzky,
INVENTORS
BY
ATTORNEYS

United States Patent Office 3,055,759
Patented Sept. 25, 1962

---

3,055,759
TEMPERATURE INDICATORS
John C. Busby, 1431 Martha Custis Drive, Alexandria, Va., and Clarence Retzky, 601 Thelma Circle SW., Vienna, Va.
Filed Apr. 13, 1959, Ser. No. 806,193
3 Claims. (Cl. 99—192)
(Granted under Title 35, U.S. Code (1952), sec. 266)

The invention herein described may be manufactured and used by or for the Government of the United States for governmental purposes without payment of any royalties thereon or therefor.

The present invention relates to temperature indicators. More particularly, the invention relates to a temperature indicating device for frozen food and other products where thawing or elevated temperatures may cause deleterious effects thereto.

Frozen and chilled foodstuffs are widely used today, as are biologicals, chemicals, pharmaceuticals and other materials which must be stored and shipped at reduced temperatures to avoid spoilage. Such items deteriorate rapidly when their temperatures rise above certain specified temperatures and thereafter are not fit for consumption.

In certain situations involved in the handling of frozen material in a widespread supply system, thawing and subsequent refreezing may occur. For example, in transfer of the supplies from a depot to a carrier, from one carrier to another, or from a carrier to storage, they necessarily remain in the open, unprotected by refrigeration for varying periods of time. In some supply operations, the times involved are not easily controllable, for example, in the case of a military supply operation such as transfer at sea. Furthermore, it occasionally happens that food in supply depots, on shipboard or in refrigerated carriers will start to deteriorate due to heat even though the refrigeration apparatus appears to be functioning properly. Thawing or undue exposure to elevated temperatures might go undetected unless some skilled observer were present.

The consequences of thawing and subsequent refreezing, or undue exposure to elevated temperatures in this manner vary. In the case of medical supplies and some foodstuffs, the consequences might be serious and costly indeed if the supplies were actually consumed. If slight spoilage were detected as soon as it began, it would be possible to prevent additional loss by prompt action to repair malfunctioning equipment or to hurry up the transfer to storage. Furthermore, not only may costs be minimized through prevention of some spoilage, but additional savings are realized through prompt detection of spoilage when it does occur since transportation, storage, and handling costs through subsequent elements of the supply operation are avoided. And, in the case of some operations, particularly military types of operations, timely detection is essential because later replenishment is impractical. When thawing or exposure to elevated temperatures occurs, whether inadvertent or deliberate, positive visible evidence thereof is provided by the device of the present invention.

Prior art devices for providing an indication or warning of thawing or undue exposure to elevated temperature have been of several types. Most of these react essentially to temperature at the surface of the package and are unsuitable for use in a supply system of the type mentioned since package surfaces frequently reach elevated temperatures without the contents being damaged. Another type of device intended to overcome this difficulty utilizes materials which react slowly to elevated temperatures at the surfaces. However, these do not solve the problem of detecting spoilage in a widespread supply system. One package may never experience even surface thawing, while another may be moved in and out of elements in the supply systems undergoing slight surface thawing each time, but never enough to affect the package contents. Still another package may be stored inadvertently at a slightly elevated temperature which is not high enough to activate an indicator of this type, but sufficiently high to cause damage.

It is an object of our invention to provide a device for indicating thawing of frozen supplies or undue exposure of supplies to elevated temperatures.

A further object of our invention is the provision of an indicator that reacts only to the temperature changes in the interior of a package.

Still another object of the invention is the provision of an indicator that reacts promptly when the package contents reach the temperature at which spoilage may commence.

An additional object of our invention is the provision of an indicator which is relatively inexpensive to produce and use.

Yet another object of our invention is to provide an indicator which requires no special handling prior to use and is easily affixed to supplies.

Other objects and the attendant advantages of the present invention will be readily understood by reading the following description of the invention in connection with the accompanying drawings in which:

FIG. 1 shows one embodiment of the invention;
FIG. 2 is a sectional view along line 2—2 of FIG. 1;
FIG. 3 is a sectional view along line 3—3 of FIG. 4;
FIG. 4 is a plan view of a second embodiment of the invention;
FIG. 5 is a sectional view of a frozen package with the indicator of FIG. 4 inserted therein;
FIG. 6 is an elevational view of a third embodiment of the invention;
FIG. 7 is a sectional view along line 7—7 of the embodiment shown in FIG. 6;
FIG. 8 is a sectional elevational view of a fourth embodiment;
FIG. 9 is a sectional elevational view of a fifth embodiment; and
FIG. 10 is an elevational view with parts in section of another embodiment of the invention.

Referring to FIG. 1 of the invention, the embodiment shown therein comprises a dart-shaped, elongated casing 10 including a conical chamber 12, at one end, a hollow cylindrical body portion 14, a flared section 16 at the end remote from the chamber 12, and a transparent end cap 20 covering the flared end section 16. Casing 10 may be made of any suitably rigid material such as cellulose acetate or aluminum.

The cylindrical body 14 is provided with a flange 22 to which base 24 of conical chamber 12 is attached by any suitable adhesive. The base 24 of chamber 12 is provided with a diaphragm like section 26 of reduced thickness which serves as a seal between the chamber and the interior of body portion 14. A filler hole 28 provided with a seal 30 protrudes slightly from the exterior surface of the conical chamber 12. In an alternate form of construction chamber 12 and body 14 may be made of one piece.

Transparent cap 20 is provided with a downturned lip 32 which is sealed to a portion of the flared end section 16 by any suitable means. The underside of transparent end cap 20 is coated with an indicator material 34 which is visible through the cap.

In the operation of this embodiment of the invention the chamber 12 is filled through hole 28 with a liquid material whose vapors will affect the color of the indicator material 34. Seal 30 is then applied to the filler hole 28. Any suitable combination of liquid and indicator may be used, for example, the liquid may be an alkaline solution such as highly diluted alkaline water and the indicator may be phenolphthalein coated on clear cellulose acetate. The thaw indicator 10 may then be inserted in the material frozen or to be frozen with the conical chamber extending into the package. Freezing will cause the liquid in chamber to expand and rupture the thin diaphragm section 26. Then, upon thawing, the liquid will melt, releasing the alkaline vapor in the body 14 and altering the color of the indicator material 34. If desired the interior of body 14 can be coated with a suitable agent such as a starch slurry or silica sols to cause the liquid to flow to the indicator. This type of device can be inserted directly into certain products such as a side of beef so that only the cap 20 is visible, and flange 22 will prevent accidental removal.

Referring to FIGS. 3 and 4, the embodiment of the invention shown therein comprises a generally rectangular flat base 50 of any suitable flexible material, for example, cellulose acetate coated with a hydrophobic material such as glycerin. Base 50 is provided with a pointed end 52. A suitable quantity of a liquid 54 of the indicator system is carried on base 50 adjacent the pointed end 52. A thin strip of absorbent material 56 is also carried on the base 50, spaced from the liquid 54 and in contact with an indicator 60. A covering material 62 such as acetate film is laminated to the base 50 in such a manner as to form two chambers 64 and 66 separated by a seal 68. A strong bond is provided at 70 between the edges of the covering material and the edge of the base material by the laminating process, while seal 68 separating chamber 64 from chamber 66 is weak in relation to the seal 70. The seal 68 is strong enough to contain the liquid 54 under ordinary handling but will rupture when the liquid freezes and expands. Any suitable cover material 62 may be used, it being understood that a transparent or translucent section 72 is required in the vicinity of indicator 60.

The liquid, fluid, or solution contained in the first chamber and the material from which the casing is made must be selected such that they do not react substantially with each other. Further, the casing must be non-absorbent and relatively impermeable. The solution must be chosen to melt at approximately the same temperature at which the food-stuff begins to deteriorate. Eutectic solutions, glycerin-water mixtures, or alcohol-water mixtures are satisfactory for the purpose. To prevent super-cooling effects, it is advisable to include a nucleating agent such as a trace of silver chloride in the solution.

FIG. 5 illustrates the manner in which the temperature indicator just described may be applied to a package 80 containing frozen food 82, the package being further protected by an overwrap 84. The thaw indicator is inserted through a slit 86 in the package 80 and extends a substantial distance thereinto. The transparent portion 72 of the thaw indicator housing the indicator 60 is allowed to protrude from the package, but is bent to lie on the surface of the package so that the indicator is readily visible from above through the translucent or transparent overwrap.

After the device is inserted into the frozen food and freezes, the seal 68 ruptures. If the food subsequently thaws, the liquid part of the indicator system is absorbed by the wick or blotter 56 and travels therealong until it reaches the indicator section 60 which is visible on the outside of package.

FIGS. 6 and 7 show another structural embodiment of the invention in which the whole indicator is made from a single piece of transparent or translucent tubing 74. The tubing is divided into two chambers by a constriction 75 which may be a crimp or heat seal, depending on the tubing material. A cylindrical piece of absorbent material 76 which may be coated at one end with an indicating material 73, is inserted in one chamber and the end sealed at 77, while the other end is filled with activating fluid 78 and sealed at 79. This end may be formed to provide a sharp point to facilitate insertion into the product to be protected.

The modification of the invention shown in FIG. 9 is particularly useful when it is desired to introduce a delay before the indication is given. In this embodiment a small amount of a material 90, soluble in the liquid 54, is placed between the seal 68 and the absorbent material 56. This soluble material 90 may be gelatin if the liquid is a water solution. When the liquid 54 freezes, bursting seal 68, the frozen liquid comes into contact with the soluble material 90 but does not act on it. However, when the liquid melts, it will act on the soluble material 90, dissolving it, and then traveling along the wick 56 to the indicator 60. A delay equal to the time required to dissolve the gelatin is provided before indicator 60 will be activated.

In the embodiment shown in FIG. 8, the seal 68 is not required, and only the soluble material 90, separates an emulsion 92 from the indicator. In a further alternative form, not shown, the soluble material 90 of FIG. 8 could also be dispensed with. In these embodiments the liquid is suspended in an oil emulsion with the oil in the external phase so that neither the gelatin nor the indicator will be affected. Freezing separates the emulsion and permits the ice when subsequently liquified to dissolve the gelatin and come into contact with the absorbent strip or wick 56.

In the embodiment described above utilizing a soluble material as an additional seal, the length of time required for the liquid to dissolve the material and activate the indicator will depend upon the amount of material used. For certain foodstuffs or biologicals where elevated temperatures can be tolerated for short periods, this device can be used to provide an indication only after the period of time at an elevated temperature is sufficient to cause damage. Thus usable material need not be discarded merely because it has reached an elevated temperature for a short period of time. The amount of soluble material can be varied to give the proper time delay for each particular item the indicator is to be used with.

In the embodiment shown in FIG. 10, time-temperature integrations may be achieved giving a history of the thawing action. The liquid part of the system 100 is retained in the chamber 64. The indicator strip 56 is impregnated with a pH indicator dye which changes color sharply when the concentration of hydrogen ions is changed. Two wires of dissimilar metals such as a copper wire 104 and a tin wire 106 having their adjacent ends twisted together as at 108 and their free ends in contact with the opposite ends of the absorbent strip 56. The liquid 100 will rupture seal 68 upon freezing and when thawing occurs, it will permeate strip 56. Strip 56 may be impregnated with a material (such as a salt) which will enter into solution with the liquid to form an electrolyte. Alternatively, the liquid itself may be an electrolyte. In any event, when the strip 56 is wet, an electric potential will be caused by the dissimilar metals in contact with the electrolyte. Free hydrogen ions will migrate to one pole changing the pH of the electrolyte, causing a gradual change in color of the indicator as time goes on. The time-temperature relationship of this system can be calibrated as an accurate indication of the total exposure provided.

Having thus described our invention, we claim:

1. A temperature indicator for a frozen product package comprising, an elongated hollow casing, said casing being shaped to form a fluid chamber for positioning deep in said package and an indicating chamber viewable exteriorly of said package and having a fluid-tight seal between said chambers, a freezable fluid in said fluid chamber, said seal breaking to establish fluid communication between said chambers when said fluid is frozen, a second seal in said casing between said chambers, said second seal being slowly dissolvable by said fluid, and means in said indicating chamber capable of reacting with said fluid for permanently indicating thawing of said fluid.

2. A temperature indicator for a frozen product package comprising, a hollow casing, a fluid chamber in said casing at one end of said casing positioned deep in said product, said fluid chamber containing a freezable fluid, an indicating chamber in said casing and having one end thereof extending exteriorly of said package, a fluid dissolvable seal for providing a time delay interposed between said chambers, said fluid being initially frozen and when thawed dissolving said seal to established fluid communication between said chambers, capillary means extending along the length of said indicating chamber, and means in the exterior end of said indicating chamber for permanently indicating that said fluid has permeated said capillary means.

3. A temperature indicator for a frozen food package comprising, an elongated casing having a stiff flat backing strip and a thin transparent arched cover sealed at the periphery thereof to the backing strip, said cover being divided by a first seal to provide a pair of chambers, a freezable fluid in one of said chambers, said fluid breaking said first seal when frozen, a capillary member in the other of said chambers and extending along the length thereof, a second seal adjacent said first seal in said other chamber, said second seal being dissolvable by said fluid at a predetermined rate, and means indicating permanently that said fluid has permeated said capillary member.

References Cited in the file of this patent
UNITED STATES PATENTS

| | | |
|---|---|---|
| 2,460,215 | Chase | June 25, 1949 |
| 2,662,018 | Smith | Dec. 8, 1953 |
| 2,823,131 | Power | Feb. 11, 1958 |
| 2,850,393 | Romito | Sept. 2, 1958 |